United States Patent [19]

Olivier

[11] Patent Number: 6,001,146
[45] Date of Patent: *Dec. 14, 1999

[54] DEVICE AND METHOD FOR THE CONTINUOUS TREATMENT OF WASTE BY MEANS OF FLY LARVAE

[76] Inventor: Paul A. Olivier, P.O. Box 68, Waxahachie, Tex. 75168

[*] Notice: This patent is subject to a terminal disclaimer.

[21] Appl. No.: 08/870,938

[22] Filed: Jun. 6, 1997

Related U.S. Application Data

[63] Continuation-in-part of application No. 08/697,314, Aug. 22, 1996, Pat. No. 5,759,224.
[51] Int. Cl.$^6$ .............................. C05F 11/08; C12M 1/38
[52] U.S. Cl. ...................... 71/9; 71/15; 71/21; 435/290
[58] Field of Search ................................ 71/8, 9, 10, 11, 71/15, 21; 435/290.4

[56] References Cited

U.S. PATENT DOCUMENTS 3,744,145  7/1973  Maxwell et al. ............................ 34/68

*Primary Examiner*—Wayne Langel
*Assistant Examiner*—Melanie C. Wong
*Attorney, Agent, or Firm*—Jones, Day, Reavis & Pogue

[57] ABSTRACT

The invention relates to a device and a method for the continuous treatment of putrescent waste in which the waste is eaten by fly larvae. The device comprises a conveyor belt, a means to distribute the waste, a means for depositing fly larvae or fly larvae eggs onto the waste, a means for removing fly larvae from the waste and from the conveyor belt, and a means for removing the waste from the conveyor belt.

14 Claims, 3 Drawing Sheets

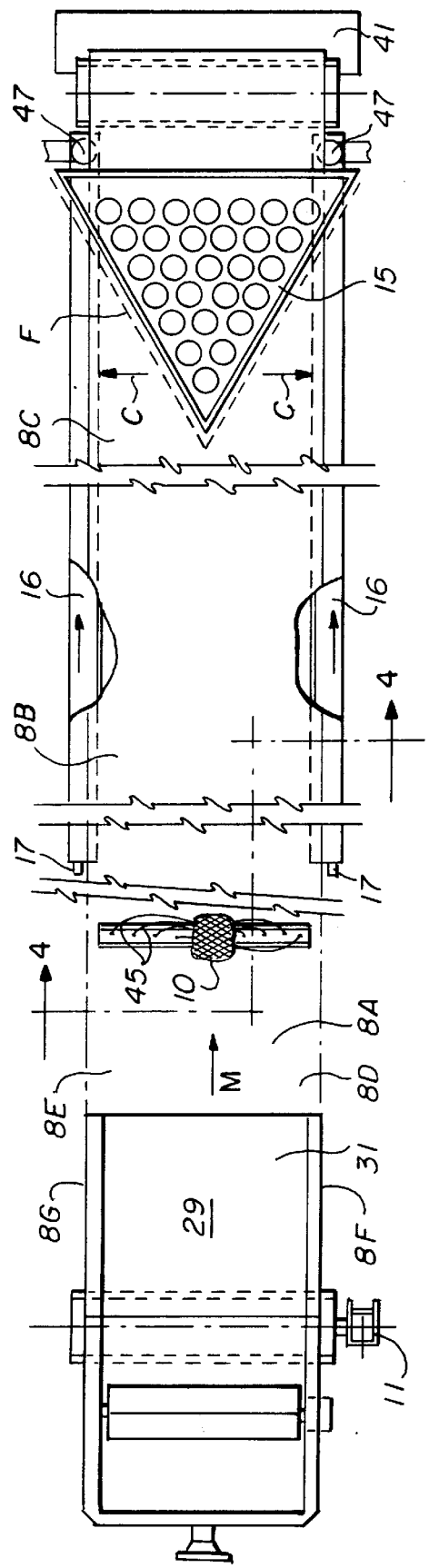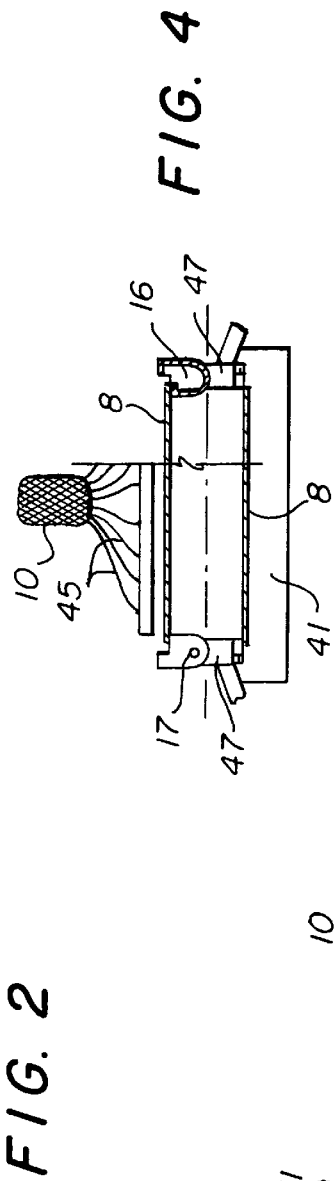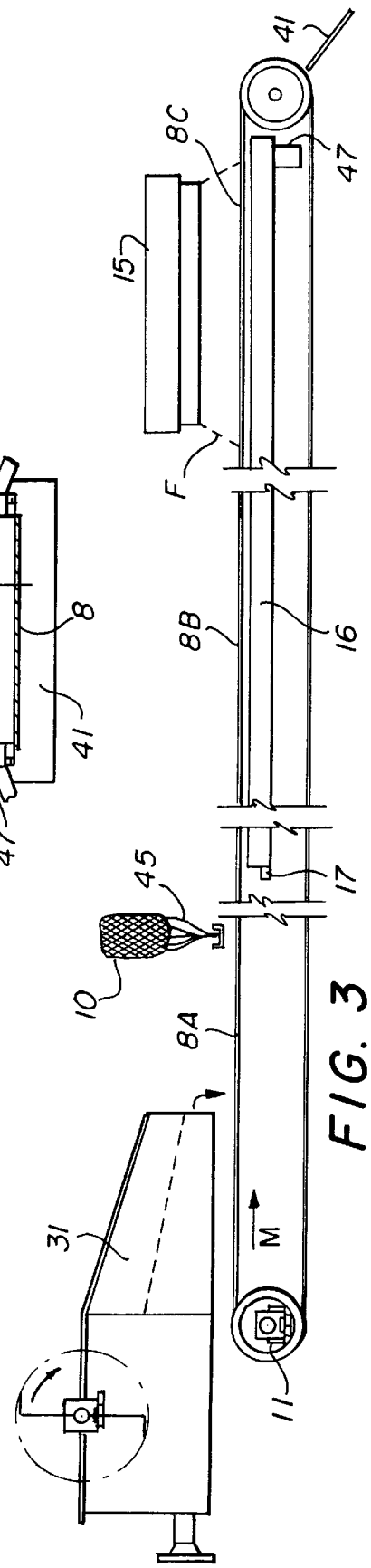

6,001,146

DEVICE AND METHOD FOR THE CONTINUOUS TREATMENT OF WASTE BY MEANS OF FLY LARVAE

CROSS-REFERENCES TO RELATED APPLICATIONS

This is a continuation-in-part application of application Ser. No. 08/697,314 filed Aug. 22, 1996, U.S. Pat. No. 5,759,224.

BACKGROUND OF THE INVENTION

1. Field of the Invention

The invention relates in general to apparatus and method for disposal of waste material and in particular to the use of fly larvae for the disposal of putrescent waste material.

2. Description of Related Art Including Information Disclosed Under 37 CFR 1.97 and 1.98

The production of organic compost for municipal refuse or garbage is well known. For example, U.S. Pat. No. 5,082,486 teaches a method for the production of organic compost comprising the following steps:

1. shredding the refuse;
2. adding water to saturation;
3. adding earthworms;
4. keeping the water content at more than 80% during at least 30 days;
5. keeping the mixture at a temperature from 0–54° C. and with a moisture of at least 45% during more than 4 months.

Such a method is not suitable for continuous treatment of large amounts of putrescent waste. Furthermore, the separation of earthworms from the treated waste materials is very difficult.

This invention relates to a device and method for the continuous treatment of large amounts of humid putrescent waste materials by means of fly larvae, so that after a relatively short period of a few days, the waste is converted into a more or less dry and odor-free compost. After treatment of the waste materials, the invention also foresees the easy separation of the larvae from the waste. Live or dehydrated larvae constitute an excellent feed stock for fish and poultry, but the larvae can also be used for the production of by-products such as protein meal, chitin, and chitosan. It has been observed that when using fly larvae for the treatment of putrescent waste materials, it is possible to induce them to crawl out of the waste by exposing the waste to an illumination, preferably together with a heating, especially an infrared illumination, whereby the separation of the larvae out of the putrescent waste is obtained by the larvae themselves.

SUMMARY OF THE INVENTION

The invention relates to a device for the treatment of putrescent waste by means of fly larvae, in which the larvae actually eat the waste, the device comprising:

a conveyor belt consisting of at least a waste reception zone, a waste treatment zone, and a waste evacuation zone;

a means to distribute the waste more or less evenly onto the conveyor belt;

a means of depositing fly larvae or fly larvae eggs onto the waste;

a means for removing fly larvae from the waste and from the conveyor belt;

a means for removing the waste residue from the conveyor belt.

One of the best ways to manage food and animal waste is to make this highly putrescent material available to very large numbers of fly larvae cultivated in a strictly enclosed and controlled environment. The larvae have voracious appetites, and certain species grow from egg to adult larvae in just two to three days. After the fly larvae have spent several days eating and tunneling their way through the waste, the moisture content of the waste can drop, through natural evaporation alone, from as high as 80% down to as low as 15%. This relatively dry fly larvae residue, after being subjected to minimal thermal drying, can be pelletized as an odor-free compost. If this compost should be contaminated by plastics and other debris, as would be the case, for example, in the disposal of human sewage sludge, it can always be thermolysed. Since the protein content of fly larvae is greater than 55%, and since the chitin content of the epidermis of the fly larvae is greater than 30%, the real commercial value lies not in the compost but in the fly larvae themselves. The simple centrifugation of fly larvae gives simultaneously both protein and chitin. Dehydrated protein sells for more than $300/ton, and deacetylated chitin, called chitosan, sells at times for as much as $60,000/ton. As a polycationic carbohydrate polymer, chitosan is an extremely valuable flocculent used extensively for the advanced treatment of wastewater.

One of the preferred means of removing the fly larvae from the waste and off the conveyor belt consists of inducing the larvae to crawl out of the waste and off the conveyor belt by means of a graduated application of light or heat or a combination of both onto the fly larvae and onto the waste. Since fly larvae are negatively phototropic, and since they are uncomfortable or may even die at high temperatures, they can be induced to crawl toward one or both of the lateral edges of the conveyor belt. Preferably, they can be induced to crawl toward one or both lateral edges of the conveyor belt by means of a graduated series of lamps. For example, tests have shown that infrared lamps are very effective in this regard.

The graduated application of light and heat advantageously creates a zone in which a temperature higher than the temperature of the treatment zone of the waste is reached, the temperature being, for example, 5° C. to 25° C. (9° F.–45° F.), preferably 10° to 15° C. (18° F. to 27° F.), higher than the temperature of the treatment zone. The zone has a front line through which the waste enters by means of relative motion between the conveyor belt and the means for gradually applying light and heat. The front line may have, in the preferred embodiment, at least one curved and/or inclined section with respect to the direction of the motion of the conveyor belt, so that the larvae are induced to crawl towards one or both of the lateral edges of the conveyor belt.

Preferably, the means to distribute the waste does not distribute the waste over the entire width of the conveyor belt. This leaves the two lateral edges of the conveyor belt free of waste. The width of the lateral edge free of waste is preferably at least twice the maximum length of the fly larvae being induced to crawl out of the waste. The two lateral edges of the conveyor belt are left free of waste, so that as the fly larvae crawl out of the waste, any particles of waste adhering to the fly larvae might become detached from the fly larvae as they crawl toward the lateral edge of the conveyor belt. The lateral edge may be provided with means for improving the detachment of waste particles from the fly larvae. Pins, needles, bristles, holes, and indentations within or upon the conveyor belt are examples of such means.

Upon arriving at the edge of the conveyor belt, the fly larvae are further induced by light and/or heat to crawl entirely off the surface of the conveyor belt, thereupon falling or sliding directly into an area wherein they would be immediately consumed. Preferably, the fly larvae would fall or slide off the conveyor belt into a fly larvae collection and evacuation system, which may consist of a trough into which the larvae slide or fall, the trough being provided with a system for creating a stream of water for transporting the fly larvae along the bottom of the trough. In the preferred embodiment, the device advantageously further comprises a screen, trommel, or sieve for the rinsing and dewatering of the fly larvae.

Several such fly larvae cultivation belts can be stacked one above the other, and several conveyor belt stacks can be situated in a single chamber. The temperature and humidity within this fly larvae cultivation chamber can be controlled so as to create an atmosphere ideally suited for the fastest growth rate of the larvae.

The invention relates also to a method for the continuous treatment of waste by means of fly larvae, in which larvae eat the waste, the method comprising the following steps:

discharging and more or less evenly distributing putrescent waste onto a conveyor belt;

depositing fly larvae eggs or fly larvae onto the waste;

ensuring the hatching of the eggs;

ensuring a minimum residence time of the larvae in the waste so that substantially all of the waste is eaten and so that the majority of the fly larvae reach maturation;

exposing a part of the waste to light and/or heat in such a way that the larvae crawl out of the waste and off at least one lateral edge of the conveyor belt; and removing the waste from the conveyor belt.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which:

FIG. 2 is a plan view of the conveyor belt system of a device of the invention;

FIG. 3 is a side view of the conveyor belt system of a device of the invention;

FIG. 4 is a cross-sectional view of the conveyor belt system along the lines IV—IV;

DETAILED DESCRIPTION OF THE PREFERRED EMBODIMENT(S)

Figure 1:
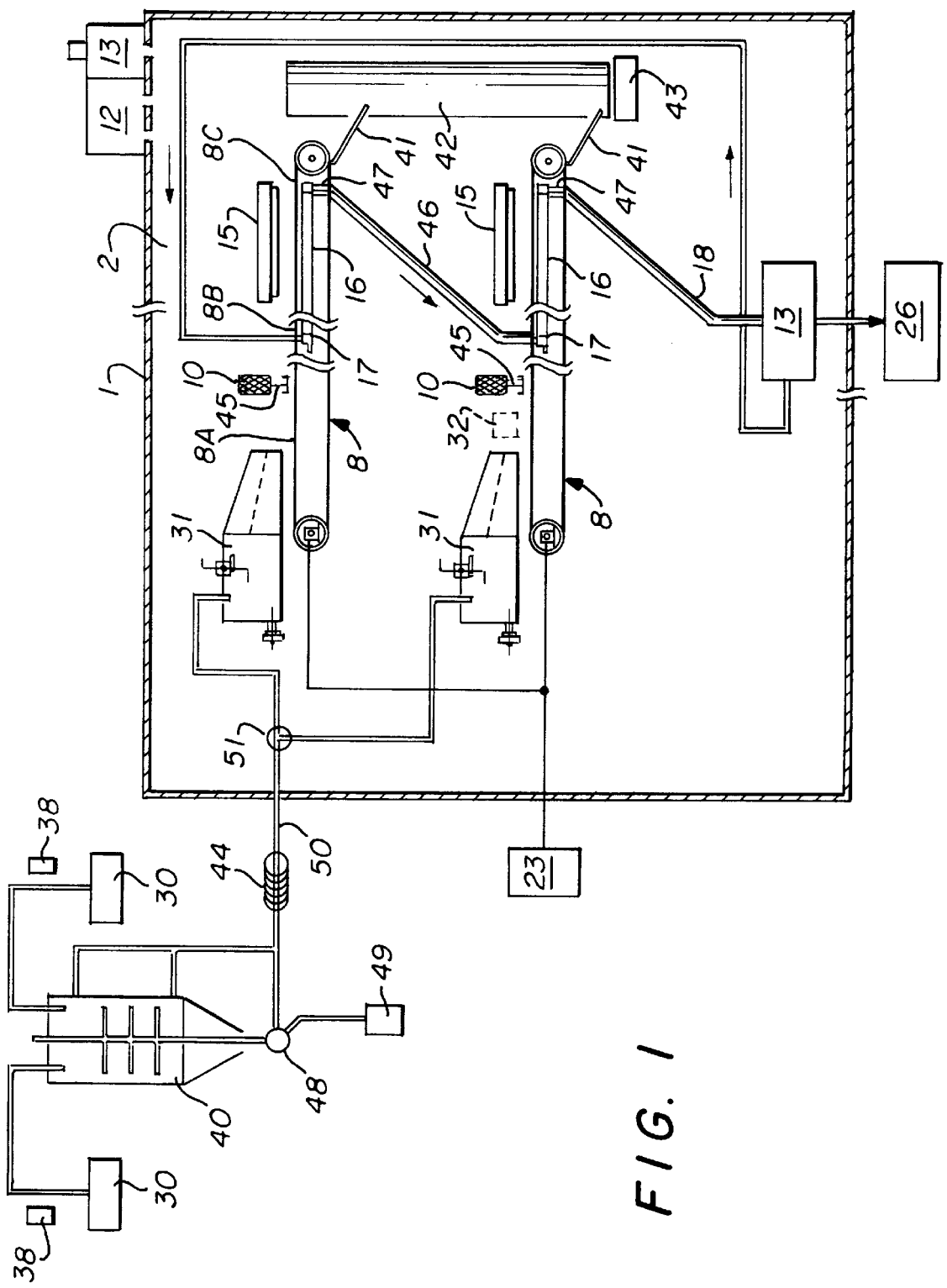
FIG. 1 is a flow diagram of the preferred embodiment of a device of the invention.
Figure 5:
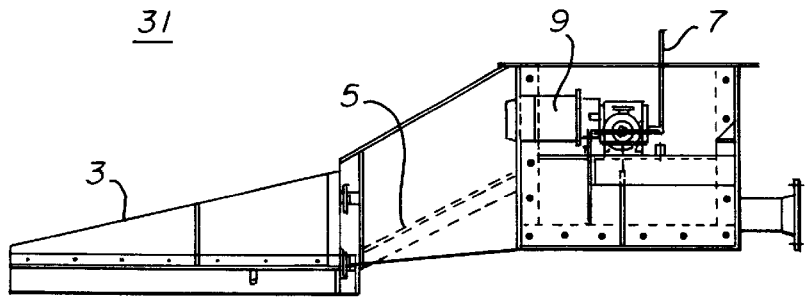
FIG. 5 is a side view of the paddle box.
Figure 6:
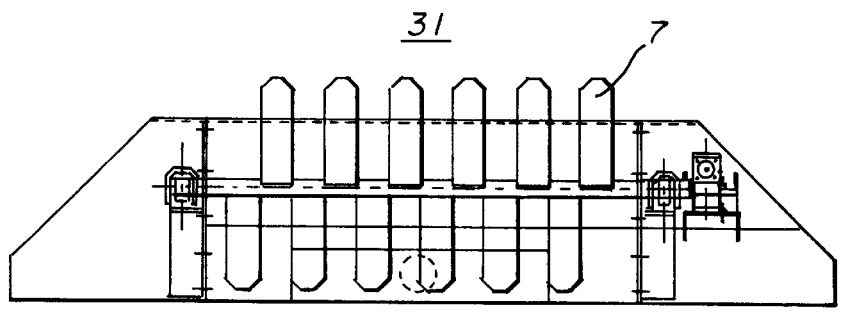
FIG. 6 is an end view of the paddle box.
Figure 7:
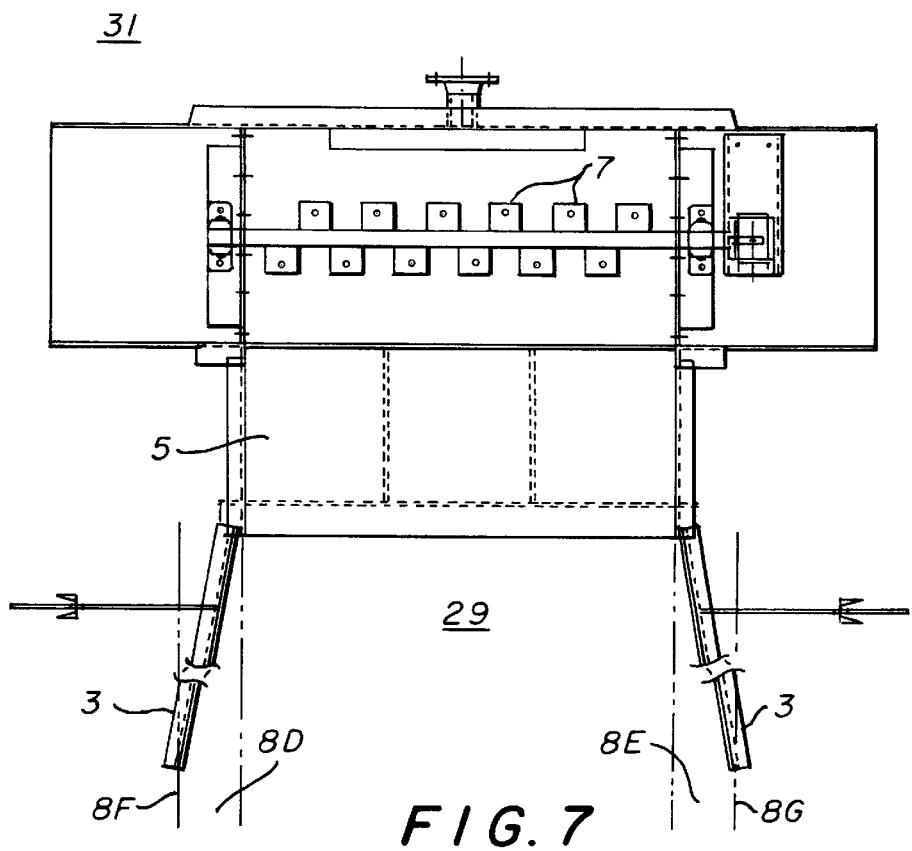
FIG. 7 is a top view of the paddle box.

FIG. 1 is a flow diagram of a device (given as example only) for continuous treatment of putrescent waste by means of fly larvae in which the fly larvae actually eat the waste. The device comprises walls 1 defining a fly larvae cultivation chamber 2 for the treatment of putrescent waste. A stack of at least two conveyor belt systems 8, each having a waste reception zone 8A, a treatment zone 8B in which the putrescent waste is more or less completely eaten by fly larvae, and an evacuation zone 8C, is designed so as to transport the waste and the fly larvae eating the waste from the reception zone 8A towards the evacuation zone 8C. A system 30 grinds putrescent waste material to be treated so as to form a pulp containing particles of more or less uniform grain size, the grain size being preferably smaller than the size of the adult fly larvae mouth, and a blending and holding tank 40 contains the ground putrescent waste. A pump 48 transfers the waste from the blending and holding tank 40 to the paddle box 31, shown in detail in FIGS. 5, 6, and 7. A variable speed control system 49 for pump 48 controls the discharge rate of waste into the paddle box 31. A pipe or other transfer means 50 is used to transfer the ground waste from pump 48 into paddle box 31, the pipe or transfer means 50 being provided with a heating system 44.

A valve 51 is mounted on pipe 50 to select sequentially the specific paddle box 31 and conveyor belt 8 that are to receive the waste. The distribution paddle box 31 has paddles that, in the preferred embodiment, turn in a direction opposite the flow of material so as to ensure a more or less even deposition of the ground putrescent waste down an inclined chute onto the central section of a long conveyor belt (80–100 meters), leaving the lateral surfaces 8D, 8E of the conveyor belt (see FIG. 2) adjacent the lateral edges 8F, 8G free of waste. One or more distribution bags 10 contain an aqueous suspension of fly larvae eggs, the bags 10 being made preferably of plastic, and being connected to one or more tubes 45 through which the suspension liquid containing eggs drops onto the waste exiting the paddle box. A container with holes in the bottom could also be used to drip larvae onto the conveyor belt 8. A motor and speed reducer 11 (see FIG. 2) drives the conveyor belt 8, the motor being associated with a system well known in the art for controlling the speed of the conveyor belt 8. An air-conditioning system 12 controls the most appropriate temperature, humidity, and oxygen content in the fly larvae cultivation chamber (for example, between 28–38° C. [82° F.–100° F.] between 30–90% relative humidity), depending on the species of fly larvae used. An air-scrubbing system 13 deodorizes the waste material leaving the fly larvae cultivation chamber in a well-known manner.

Infrared lamps 15 are located in the evacuation zone 8C for inducing the larvae to crawl out of the waste. Two troughs 16, one on each lateral side of the conveyor belt (see FIG. 2), collect and transport the larvae falling or sliding from the conveyor belt 8, each trough 16 having a water inlet 17 so as to create a high-speed water stream for transporting the larvae out of the trough, as well as an outlet 47 for evacuating the water and fly larvae. A transfer pipe 46 (FIG. 1) connects the outlet 47 of a first conveyor belt trough to the inlet 17 of a second conveyor belt trough, the second conveyor belt preferably being situated below the first. A pipe 18 through which the water stream with larvae flows toward a central rinsing and dewatering device 19 that may be, for example, a vibratory dewatering screen. A conveyor belt scraper 41 is used for scraping and cleaning the conveyor belt and for transferring the fly larvae residue onto a chute 42. A centralized conveyor belt 43 receives waste from one or more waste chutes 42 and a storage area or surge bin (not shown) receives the waste from conveyor belt 43. A variable speed control system 23 is used to determine the speed or the intermittent movement of the conveyor belt (for example, if the larvae in the evacuation zone have not reached optimal maturation, the speed of the conveyor belt is reduced so as to increase the residence time of the larvae on the conveyor belt). A system 32, shown in phantom lines in FIG. 1 and well known in the art, may be used for measuring the thickness of the waste deposited on the conveyor belt and controlling the amount of eggs or larvae to be added to the waste, so that the appropriate amount of eggs or larvae is added according to the thickness of waste on the belt, the system controlling, for example, the outlet of eggs or larvae from the distribution box 10 as shown in FIG. 4. A system 38, well known in the art, can be used for determining the presence of heavy metals or other contaminants in the waste, the system preventing the entry of contaminated waste into the blending and holding tank 40.

The paddle box 31 ensures an even deposition of the waste from chute 5, between distribution arms 3, on the conveyor belt 29 (FIG. 7), but not over the entire width of the conveyor belt. This leaves the lateral surfaces 8D, 8E (see FIG. 2) of the conveyor belt adjacent the lateral edges 8F, 8G free of waste. The lateral surfaces 8D, 8E are preferably about 10 cm in width and are provided with pins, needles, bristles, indentations, or holes, all of which may serve as a means for improving the detachment of waste particles adhering to the larvae crawling off the conveyor belt.

Upon reaching maturity, fly larvae naturally crawl out of the waste but, since they do not all reach maturity at exactly the same time, infrared lamps 15 are used for inducing the fly larvae to crawl out of the waste and off the conveyor belt in a synchronized and orderly manner. Even the direction in which the fly larvae crawl can be controlled by means of the graduated application of light and heat. The lamps 15 are preferably mounted in the form of a triangle, as shown in FIG. 2, with one corner of the triangle intersecting the vertical plane passing through the middle line of the conveyor belt as shown so as to induce the fly larvae to crawl left and right of the middle line. When the conveyor belt is in motion, preferably all the lamps within the triangle are ON. When the conveyor belt is not in motion, preferably only some of the lamps are ON, effectively providing a barrier across which the fly larvae would be reluctant to crawl.

The lamps 15 create a zone (see FIG. 3) in which a temperature higher than the temperature of the treatment zone 8B is reached, the temperature being in the range of 9° F.–45° F. (5°–25° C.), for example, 18° F.–27° F. (10°–15° C.) higher than the temperature in the treatment zone. The zone has a front line (F) through which the waste enters by means of a motion (M) of the conveyor belt, the front line (F) being adapted with respect to the direction of the motion (M) of the conveyor belt 8 so that the larvae are induced to crawl towards the lateral edge 8F or towards the lateral edge 8G of the conveyor belt. Clearly, the front, F, of the zone could be curved either in a concave or a convex fashion. A convex front, F', is shown in phantom lines in FIG. 2. The fly larvae evacuation trough 16 (see FIGS. 2 and 3) also serves as means for washing or rinsing the larvae. The larvae collected in the trough 16 can be sold as live fly larvae, but preferably they are further treated in a plant 26 (FIG. 1) for producing protein meal, chitin, chitosan, and other valuable products.

The preparation of eggs can be ensured by female flies induced to lay eggs in an egg deposition chamber (not shown), for example, onto a surface especially prepared for this purpose. By rinsing this surface, it is possible to collect the eggs in the form of an aqueous egg suspension. The suspension may be temporarily stored and transported in sealed plastic bags or other containers.

The waste to be treated, when solid, is preferably ground before treatment in the device according to the invention. The grinding is preferably such that the particle size of the particles possibly adhering onto the larvae crawling out of the waste is small enough that these particles can be easily rinsed and screened off the fly larvae by means of an appropriate rinsing and dewatering device.

Some examples of the kinds of putrescent waste that can be treated are wasted human food, food waste from canneries and slaughter houses, animal sewage, human sewage sludge, etc. Since the fly larvae grow from egg to pupae in just two to four days, depending on the species of fly being used, the waste processing and disposal time is extremely rapid compared to classical composting techniques. After eating and tunneling their way through the waste over several days, the fly larvae leave behind a relatively dry residue that serves ideally as a compost. This compost can be mixed with water so as to form a pulp suitable for further treatment by means of fly larvae or earthworms.

By means of the device of FIG. 1, the following method of treatment can be effected. The treatment is continuous in the sense that the waste material is continuously treated by means of the fly larvae between the reception zone and the evacuation zone, yet the conveyor belt 8 does not have to be continuously in motion. It is often desirable to stop the conveyor belt for a specified period of time so as to ensure a sufficient residence time of the waste to be treated on the conveyor belt.

A method of treatment of putrescent waste is disclosed hereafter and comprises the following steps:

discharging and more or less evenly distributing putrescent waste onto a conveyor belt having two lateral edges;

ensuring a continuous or intermittent movement of the conveyor belt;

depositing fly larvae eggs onto the waste;

ensuring the hatching of the eggs into larvae by means of an appropriate temperature and moisture;

ensuring a minimum residence time of the larvae in the waste so that substantially all of the putrescent waste is eaten by the fly larvae and so that the majority of the fly larvae reaches maturation;

exposing a part of the waste to light and heat in such a way that the fly larvae crawl out of the waste and off at least one of the lateral edges of the conveyor belt, the light and heat also serving to partially dehydrate the fly larvae residue; and removing the fly larvae residue from the conveyor belt.

Advantageously, the fly larvae crawling off the conveyor belt are collected in a trough 16, and a current of water is created in the trough for transporting the collected fly larvae to a rinsing and dewatering system in which the fly larvae are rinsed and dewatered.

Preferably, for removing fly larvae from the waste, light and heat are gradually applied onto the fly larvae and onto the waste. For example, a zone with a temperature higher than the temperature of the treatment zone is created, the temperature being 9° F.–45° F. (5°–25° C.), preferably, 18° F.–27° F. (10°–15° C.) higher than the temperature in the treatment zone.

In a preferred method, the zone has a front line (F) through which the waste enters by means of a motion (M) of the conveyor belt, the front line being adapted with respect to the direction of the motion of the conveyor belt so that the larvae are induced to crawl towards at least one lateral edge of the conveyor belt, preferably towards the lateral edge 8F or towards the lateral edge 8G.

In the device of FIG. 2, the front line (F) can be seen to have two edges (angular shape) that are inclined with respect to the direction of the motion of the conveyor belt. The sections could also be curved in a concave or a convex manner with respect to the direction of belt motion. The angle required between an inclined section and the direction of the motion depends on the speed of movement of the conveyor belt and on the average speed of the crawling of the fly larvae used for eating the waste.

Preferably, the waste is not distributed over the entire width of the conveyor belt, so as to leave free of waste the two lateral edges 8F and 8G of the conveyor belt 8, as well as the lateral surfaces 8D and 8E adjacent the lateral edges.

The fly larvae crawling out of the waste are then induced to crawl on at least one lateral surface 8D or 8E of the conveyor belt 8 that is free of waste. Advantageously, the fly larvae come into contact with one or more means such as pins, needles, bristles, holes, or indentations, 8H, (see FIG. 4) located on the lateral surface free of waste, so as to detach waste particles adhering to the fly larvae. For example, the fly larvae crawling out of the waste are induced to crawl over a distance of at least ten centimeters free of waste, the distance being at least equal to twice the maximum length of the fly larvae induced to crawl out of the waste.

Various species of fly larvae can be used for the treatment method. However, it is advisable to select the species more adapted for eating the waste to be treated. Some species of fly larvae reach a length of 20 to 25 mm at maturation. Since the protein content of fly larvae is greater than 55%, and since the chitin content of the epidermis of the fly larvae is greater than 30%, the real commercial value of this treatment method lies not in the compost but in the fly larvae themselves. The simple centrifugation of fly larvae gives simultaneously both protein and chitin, two very valuable products.

In a method according to the invention, fly eggs in an egg suspension were dropped or otherwise placed on finely ground fresh waste in the form of a pulp (water content of the pulp: about 65–75%). The eggs hatched within 24 hours. Of course, the eggs could be first hatched and then the larvae placed on the waste. They could be placed in a container with holes in the bottom and dripped through the holes onto the waste. After 72 hours, the larvae reach maturation and are eating the waste. They do not want to pupate in the waste as they tend to flee the waste. In the present invention they were further induced to crawl off the conveyor belt with the use of graduated light since they also flee from light and heat. They are thus driven into a gutter on each side of the conveyor belt. The residue of the waste treated by the larvae has then a water content of less than 20%, for example, about 15% by weight, because holes or tunnels formed by the larvae eating the waste causes the moisture to evaporate. The residue has, furthermore, no special odor problem. The waste treatment is preferably made in a substantially closed chamber, since an ammonia odor is present during treatment process and can be controlled by an air-scrubbing system 13, well known in the art.

The thickness of the fresh waste deposited on the conveyor belt is advantageously limited to a few centimeters, for example, from 2 to 4 cm, so that the food present at the bottom of the waste is sufficiently available to the larvae. Furthermore, if the waste layer is too thick, the fly larvae present at the bottom would possibly not be induced to crawl out of the waste or would require too long a time period for crawling out of the waste whereby the speed of movement of the conveyor belt would have to be reduced. A too thick layer of waste will also reduce the speed of treatment, since the oxygen availability at the bottom of the waste will be reduced.

The corresponding structures, materials, acts, and equivalents of all means or step plus function elements in the claims below are intended to include any structure, material, or act for performing the function in combination with other claimed elements as specifically claimed.

What is claimed is:

1. A method for the continuous treatment of waste by means of fly larvae, in which the said fly larvae actually eat the waste while the waste is on a conveyor belt, said method comprising the following steps:

discharging and substantially evenly distributing putrescent waste to be eaten by fly larvae onto a conveyor belt having two lateral edges;

moving the conveyor belt;

depositing fly larvae eggs onto the waste subsequent to said waste being discharged onto said conveyor belt;

ensuring a minimum residence time of the larvae in the waste so that said eggs hatch and substantially all the putrescent waste is eaten by the hatched fly larvae and so that the majority of the fly larvae reaches maturation;

exposing a part of the waste to light and heat in such a way that the fly larvae crawl out of the waste and off the conveyor belt through at least one of its lateral edges; and removing the waste from the conveyor belt.

2. The method of claim 1 further comprising the steps of:

collecting the fly larvae crawling off the conveyor belt in a trough; and creating a current of water in the trough for transporting the collected fly larvae to a rinsing and dewatering system in which the fly larvae are rinsed and dewatered.

3. The method of claim 1 further comprising the step of gradually applying light and heat onto the fly larvae and onto the waste for removing fly larvae from the waste.

4. The method of claim 3 further comprising the step of creating a zone with a temperature higher than the temperature of the treatment zone for removing fly larvae from the waste, said temperature being 9° F. to 45° F. (5° C.–25° C.) higher than the temperature in the treatment zone.

5. The method of claim 3 further comprising the step of creating a zone with a temperature higher than the temperature of the treatment zone for removing fly larvae from the waste, said temperature being 18° F. to 27° F. (10° C.–15° C.) higher than the temperature in the treatment zone.

6. The method of claim 1 further including the steps of:

gradually applying light and heat onto the fly larvae and onto the waste for removing fly larvae from the waste, so as to create a zone with a temperature higher than the temperature of the treatment zone;

said created zone having a front line through which the waste enters by means of a relative motion between the conveyor belt and the light and heat applied; and said front line being adapted with respect to said relative motion so that the larvae are induced to crawl towards at least one lateral edge of the conveyor belt.

7. The method of claim 1 further including the step of:

gradually applying light and heat onto the fly larvae and onto the waste for removing fly larvae from the waste, so as to create a zone with a temperature higher than the temperature of the treatment zone;

forming a front line with said created zone through which the waste enters by means of a relative motion between the conveyor belt and the light and heat applied; and locating said front line with respect to said relative motion so that the larvae are induced to crawl towards both lateral edges of the conveyor belt.

8. The method of claim 1 further including the step of:

gradually applying light and heat onto the fly larvae and onto the waste for removing fly larvae from the waste, so as to create a zone with a temperature higher than the temperature of the treatment zone;

forming a front line with said created zone through which the waste enters by means of a relative motion between the conveyor belt and the light and heat applied; and forming said front line with at least one section curved with respect to the direction of said relative motion so that the larvae are induced to crawl towards at least one lateral edge of the conveyor belt.

9. The method of claim 1 further including the step of:

gradually applying light and heat onto the fly larvae and onto the waste for removing fly larvae from the waste, so as to create a zone with a temperature higher than the temperature of the treatment zone;

forming a front line with said created zone through which the waste enters by means of a relative motion between the conveyor belt and the light and heat applied onto the fly larvae and onto the waste; and forming said front line with at least one section inclined with respect to the direction of said relative motion so that the larvae are induced to crawl towards at least one lateral edge of the conveyor belt.

10. The method of claim 1 further comprising the step of distributing the waste in such a manner so as to leave free of waste the two lateral edges of the conveyor belt, as well as the lateral surfaces adjacent said lateral edges.

11. The method of claim 10 further comprising the steps of:

inducing the fly larvae crawling out of the waste to crawl on at least one lateral surface of the conveyor belt that is free of waste; and detaching waste particles adhering to the fly larvae as said fly larvae come into contact with the said lateral areas free of waste.

12. The method of claim 10 further comprising the step of inducing the fly larvae crawling out of the waste to crawl over a distance on at least one lateral area of the conveyor belt that is free of waste, said distance being at least equal to twice the maximum length of the fly larvae induced to crawl out of the waste.

13. The method of claim 1 further comprising the steps of:

performing the continuous treatment of waste in a substantially closed chamber; and scrubbing the air in the closed chamber to remove any existing unwanted odors.

14. The method of claim 1 further comprising the step of limiting the thickness of the putrescent waste to the range of about 2 cm to about 4 cm.

* * * * *